United States Patent [19]

Powell et al.

[11] 4,254,780
[45] Mar. 10, 1981

[54] APPARATUS FOR DISCHARGING THRESHED MATERIALS DIRECTLY FROM THE ROTOR OF AN AXIAL FLOW COMBINE

[75] Inventors: Thomas E. Powell; Edward Donaldson; Ronald F. McNeil, all of Brantford, Canada

[73] Assignee: White Motor Corporation of Canada Limited, Canada

[21] Appl. No.: 2,297

[22] Filed: Jan. 10, 1979

[30] Foreign Application Priority Data

Oct. 31, 1978 [CA] Canada .................................. 315534

[51] Int. Cl.$^3$ .............................................. A01F 12/18
[52] U.S. Cl. .................................. 130/27 T; 56/14.6; 130/27 R
[58] Field of Search ............. 56/14.6; 130/27 T, 27 R

[56] References Cited

U.S. PATENT DOCUMENTS

| 3,589,111 | 6/1971 | Gullickson et al. | 56/14.6 |
| 4,056,107 | 11/1977 | Todd et al. | 130/27 T |
| 4,148,323 | 4/1979 | McMillen et al. | 130/27 T |

FOREIGN PATENT DOCUMENTS 1403525  8/1975  United Kingdom ..................... 56/14.6

*Primary Examiner*—Jay N. Eskovitz

*Attorney, Agent, or Firm*—Lockwood, Dewey, Alex & Cummings

[57] ABSTRACT

Apparatus for discharging threshed crop materials, in a relatively uniform manner across the body width of the combine, directly from the discharge end of a threshing and separating rotor in an axial flow combine without the need for additional apparatus at the discharge end of the rotor to discharge the threshed materials or to avoid plugging or bunching of crop materials between the rotor and rotor casing. The rotor extends longitudinally through the combine to a discharge area at the discharge end of the rotor. The rotor casing closely surrounds the rotor near the discharge end and guide vanes disposed in the rotor casing cooperate with separating elements circumferentially disposed about the rotor near the discharge end to positively move threshed materials toward the discharge end of the rotor. The casing terminates short of the discharge end of the rotor in progressively increasing angular widths in the direction of the discharge end such that the materials are tangentially discharged from differing circumferential points of the rotor exposed by the casing terminations for a multi-stream discharge. A deflector plate disposed below the exposed portions of the rotor deflects the discharged materials rearwardly for enhanced dispersion and reduces the discharge velocity.

9 Claims, 10 Drawing Figures

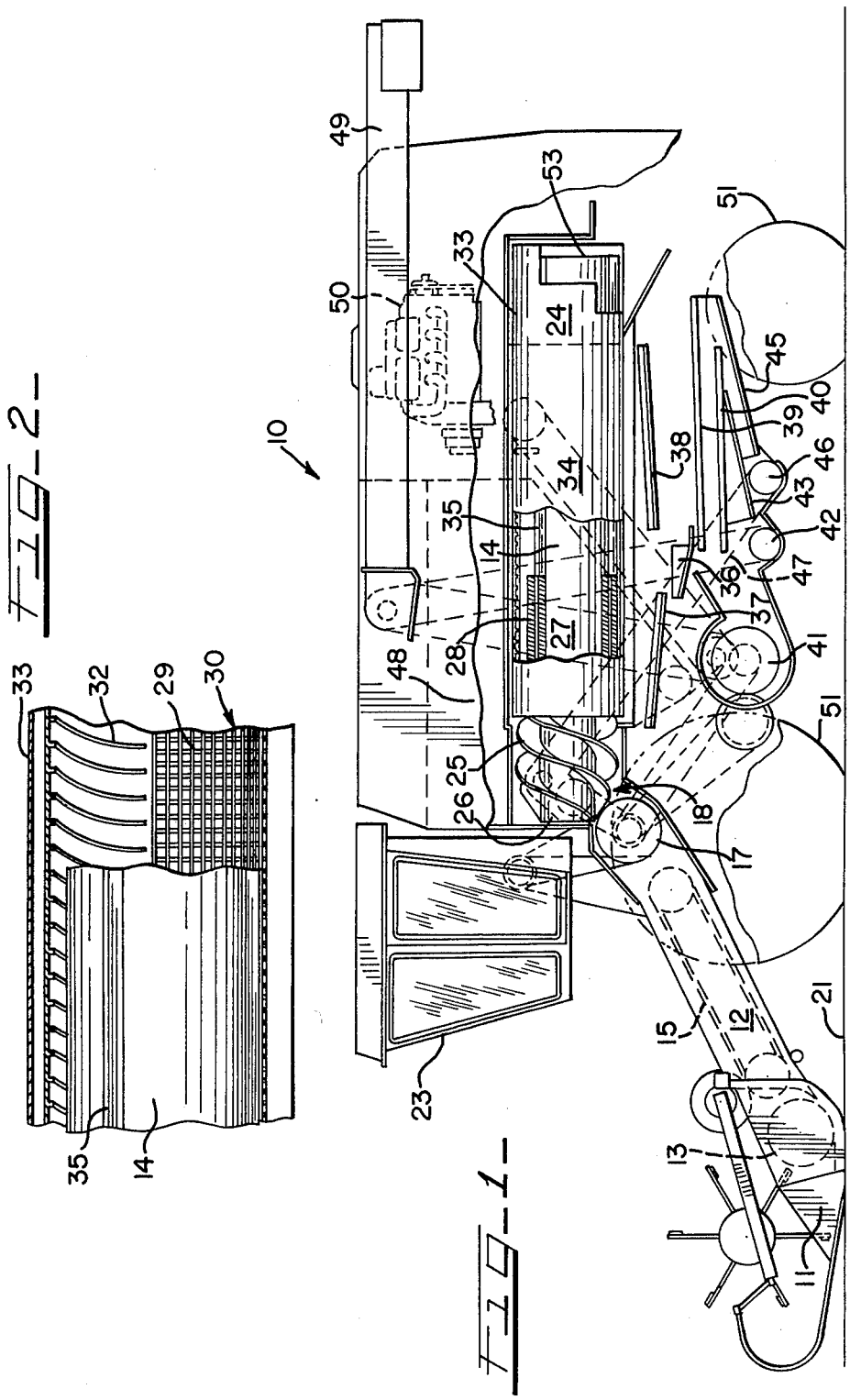

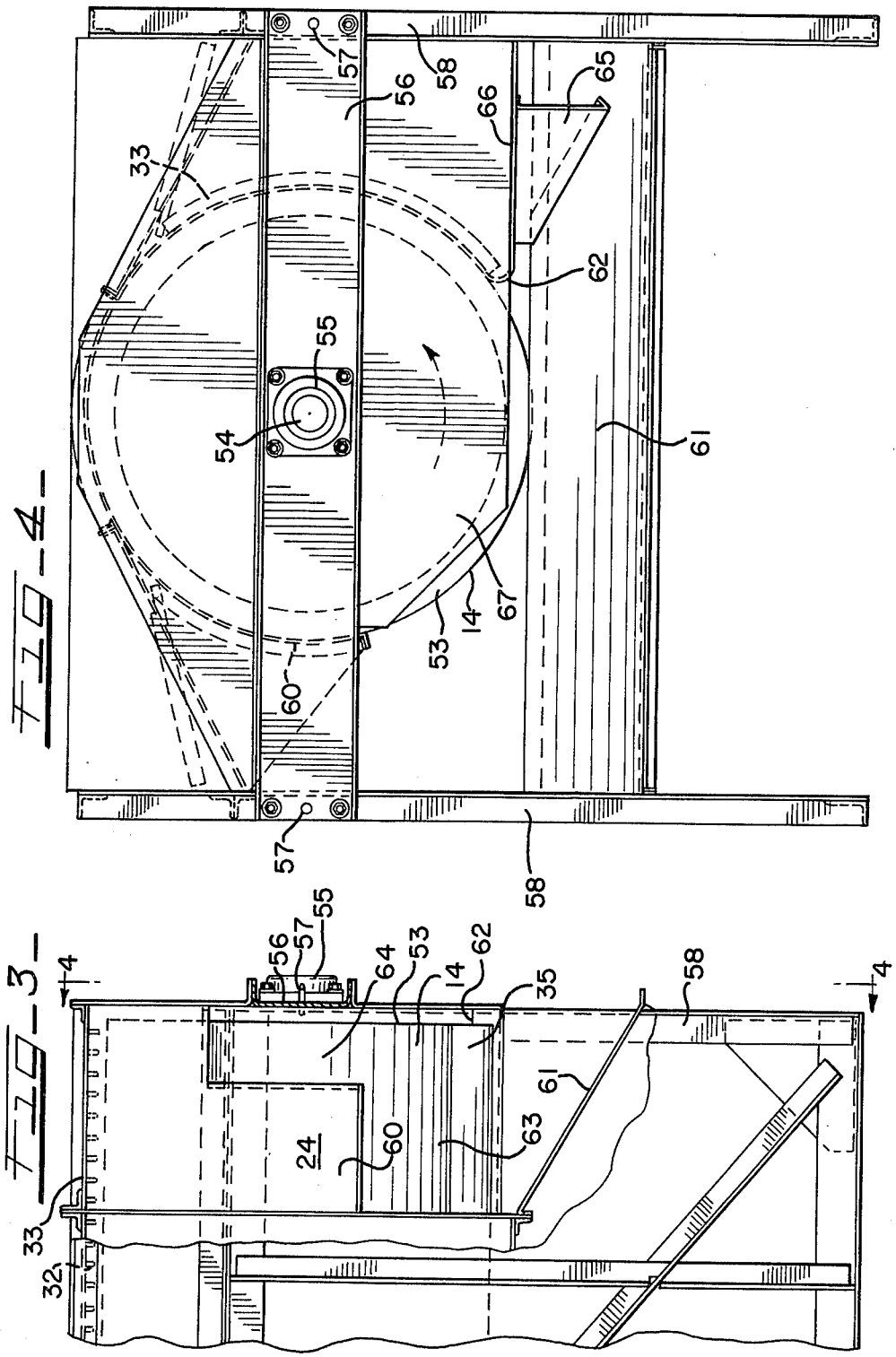

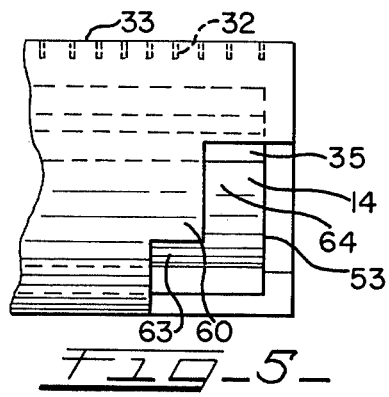
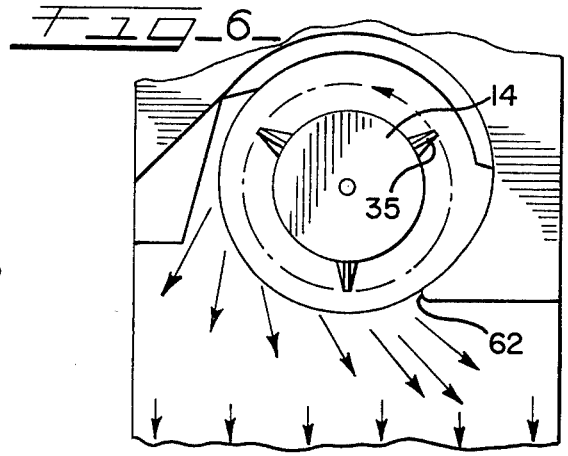
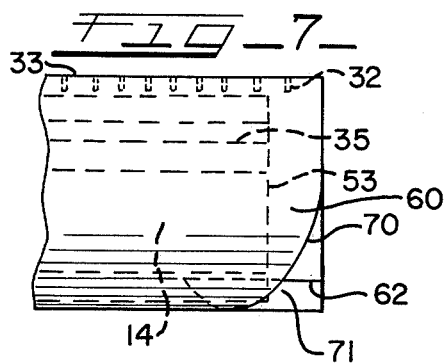
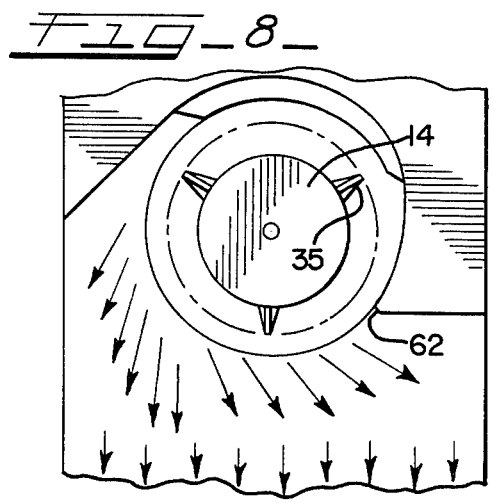
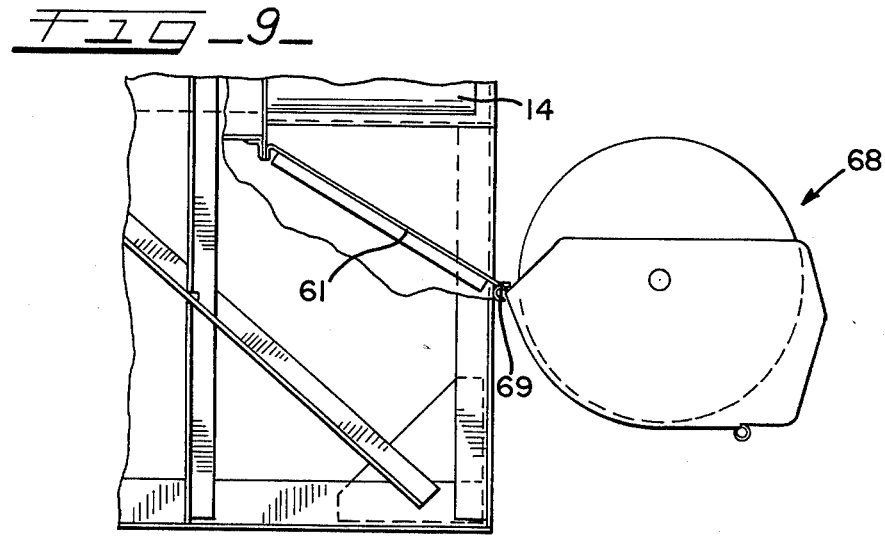

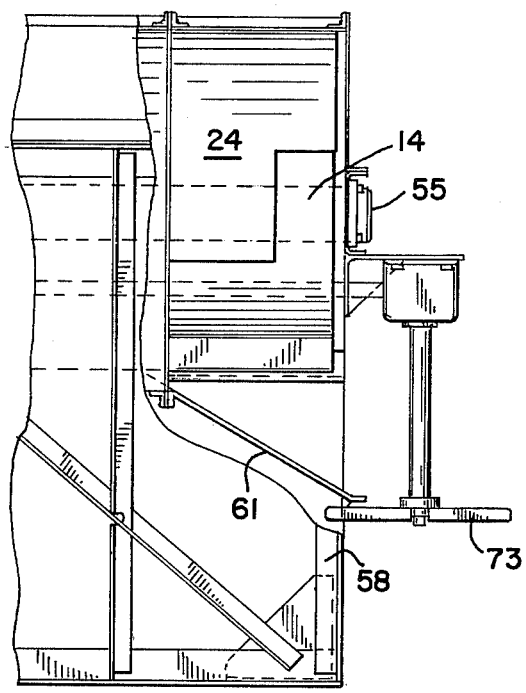
_Fig. 10_

APPARATUS FOR DISCHARGING THRESHED MATERIALS DIRECTLY FROM THE ROTOR OF AN AXIAL FLOW COMBINE

This invention relates to discharging threshed crop materials from an axial flow combine and is more particularly concerned with improvements in providing a relatively uniform dispersion of the threshed crop materials across the body width of the combine directly from the discharge end of a threshing and separating rotor, longitudinally disposed in the combine, by closely surrounding the rotor with the rotor casing near the discharge end thereof for positive movement of the crop materials toward the discharge end, but terminating the casing short of the discharge end such that the threshed materials discharge from the rotor at differing tangential points for deflection by a deflecting plate disposed below the discharge end of the rotor before dropping to the ground or being introduced to chopping or spreading apparatus.

A number of differing types of axial flow combines for harvesting various types of agricultural crops are known to the prior art. Such prior art combines have a generally cylindrical threshing and separating rotor disposed in the combine for removing grain or corn from the stems, stalks, cobs or the like of the crop materials. In many of the prior art axial flow combines, the rotor is relatively short and terminates internally in the combine well short of the discharge area of the combine. An expansion chamber is often provided at the discharge end of the rotor for moving the threshed materials by means of additional discharge apparatus, such as an elevator, a rotory beater or the like, toward the discharge area of the combine. Expansion chambers are necessarily confined or limited spaces which are prone to plugging due to the lack of positive engagement of the crop materials. In those prior art machines which employ positive engagement of the crop materials, such as by pulling the materials from the rotor, plugging or bunching of material can still occur since the high volume of material which flows between the rotor and rotor casing must also be removed therefrom. It is also difficult to positively transfer the high material volumes at the required flow rates without malfunction under widely varying crop conditions.

It is frequently desired to have the threshed materials evenly or uniformly dispersed to the ground after the grain or corn has been removed therefrom by the combine. But prior art combines have not generally been able to accomplish this end without special chute designs due to the concentrated stream of material discharging from the rotor. Likewise, straw spreaders or choppers are not usable with direct discharge of crop materials in a concentrated stream from the rotor. The uniform distribution of the threshed materials on the ground makes tillage of the soil easier and promotes more rapid decay of the threshed materials in the soil. In other instances, it may be desired to gather the threshed materials by means of other implements for storage or for feed to cattle. Many implements suitable for gathering threshed materials operate more efficiently and with fewer clogging or plugging problems if the threshed materials are distributed with relative uniformity on the ground rather than in concentrated windrows.

The object of the invention, generally stated, is the provision in an axial flow combine of new and improved means for discharging or exhausting the threshed materials in a positive, non-clogging manner.

A principal object of the present invention is therefore to provide a novel and improved axial flow combine which provides a relatively uniform dispersion of the threshed materials across the body width of the combine by directly discharging the threshed materials from the discharge end of the rotor.

A further object is to provide a means of discharging threshed material from the rotor of an axial flow combine which gets the crop materials out of the narrow spacing between the rotor and rotor casing at the required crop flow rates so that the rotor is not prone to plug up under all types of crops and conditions, without the need for expansion chambers or rotary apparatus to facilitate the discharge.

Another object of the present invention is to closely surround the rotor near the discharge end with the rotor casing, but with the casing terminating short of the discharge end of the rotor at multiple points in relation to the longitudinal axis of the rotor such that the threshed materials are tangentially discharged from the rotor at differing circumferential points for a multi-stream discharge of the threshed materials from the combine.

Yet another object is to provide the casing near the discharge end of the rotor with a stepped or helical edge in relation to the axis of the rotor.

Another object of the invention is to provide methods of uniformly discharging threshed materials from an axial flow combine with an elongate rotor extending to a discharge area of the combine with discharge of the threshed materials occurring tangentially from multiple circumferential points along and around the discharge end of the rotor through cutouts in the rotor casing.

A further object is to provide ease of access to the discharge end of the rotor such that the rotor may be removed from the rear of the combine without requiring removal of the header or feeder portions of the combine.

An additional object is to provide a discharge area which is simple and is easy to manufacture.

These objects and advantages of the invention, and others, including those inherent in the invention, are accomplished by an axial flow combine with an elongate threshing and separating rotor co-axially disposed in a rotor casing and extending therewith into the discharge area of the combine. Guide vanes disposed on an upper inner surface of the rotor casing cooperate with separating elements circumferentially disposed about the discharge end of the rotor 10 positively move the threshed materials toward the discharge end of the combine. The rotor casing terminates short of the discharge end of the rotor at multiple points in relation to the longitudinal axis of the rotor such that the threshed materials tangentially discharge from the rotor at differing circumferential points for a multi-stream discharge of the materials. Dispersion of the materials is enhanced by a deflecting plate disposed below the cutout portions of the rotor casing such that most of the discharged materials will deflect rearwardly from the deflecting plate for further spreading across the body width of the combine before falling to the ground.

The invention is also concerned with methods for discharging threshed materials from an axial flow combine in multiple streams by providing cutouts in the rotor casing, which closely surrounds the discharge end of the rotor, such that the rotor casing terminates short of the discharge end of the rotor at multiple circumferential points in relation to the longitudinal axis of the rotor.

The features of the present invention, which are believed to be novel and patentable, are set forth with particularity in the appended claims. The invention together with the further advantages thereof, can best be understood by reference to the following description taken in conjunction with the accompanying drawings, and the several figures in which like reference numerals identify like elements, and in which:

FIG. 1 is a partly broken away side elevational view, illustrating the general physical arrangement of an axial flow combine in accordance with the present invention wherein stepped cutouts in the rotor casing near the discharge end of the rotor and a deflecting plate disposed below portions of the discharge end of the rotor exposed by the cutouts provide multi-stream spreading of the crop materials across the body width of the combine;

FIG. 2 is a fragmentary vertical sectional view of the separating area of an axial flow rotor in the combine of FIG. 1 illustrating a concave forming the lower portion of the rotor casing for separating grain from the crop materials and helical guide vanes disposed in an upper portion of the rotor casing for progressively moving the crop materials axially along the rotor;

FIG. 3 is a partial side elevational view of the discharge area of the combine of FIG. 1 illustrating the stepped cutouts in the rotor casing to expose portions of the discharge end of the rotor;

FIG. 4 is a rear elevational view taken on line 4—4 of the discharge area shown in FIG. 3 further illustrating the stepped cutouts in the rotor casing near the discharge end of the rotor;

FIG. 5 is a diagrammatic side elevational view of the discharge end of the rotor with the rotor casing having progressively stepped cutouts in relation to the axis of the rotor in accordance with the present invention;

FIG. 6 is a diagrammatic rear elevational view illustrating the multi-stream distribution of threshed materials thrown tangentially from the discharge end of the rotor with the stepped shielding cutouts illustrated in FIG. 5;

FIG. 7 is a diagrammatic side elevational view of the discharge end of the rotor, similar to FIG. 5, but with a continuous helical edge or termination of the rotor casing in relation to the axis of the rotor, which provides a generally wedge-shaped cutout in the rotor casing;

FIG. 8 is a diagrammatic rear elevational view illustrating the distribution of threshed materials thrown tangentially from the rotor with the helical edge or termination of the rotor casing as in FIG. 7;

FIG. 9 is a side elevational view of a portion of the discharge area of the combine of FIG. 1 with a straw chopper attached to the discharge end for chopping the threshed materials before discharge to the ground; and FIG. 10 is a partly broken away side elevational view of a portion of FIG. 1 with a rotary spreading device disposed adjacent a deflecting plate in the discharge area for further spreading threshed materials before discharge to the ground.

Referring to FIG. 1, there is shown a crop harvesting combine, generally designated 10, of the axial flow type. A front header portion 11 of the floating type severs crops close to the ground. Different headers may be provided for different types of crops, such as corn headers, pickup headers, or straight cut headers. A feeder 12 conveys the crop materials to be threshed and separated from a header auger 13 to an axial flow rotor 14. Elevating and conveying means 15 disposed in the feeder 12 conveys crop materials from the header 11 to the rotor 14. The elevating and conveying means 15 operates at a sufficient velocity to adequately move the maximum anticipated crop volume from the auger 13 through the feeder 12. An inlet beater 17 rotates at a higher tangential velocity than the feeder 12 to accelerate the crop materials for delivery into a rotor inlet transition area 18. The feeder 12 is removably mounted on combine 10 near the axis of the beater 17 by a hinge-like connection such that the header 11 will have a floating action to conform to variations in the soil surface 21.

Generally disposed above the feeder 12 is a windowed cab 23 containing various operating controls (not shown) for observing and controlling the crop harvesting operation of the combine 10.

The rotor 14 is longitudinally and horizontally disposed in the combine 10 and is of sufficient axial dimension to extend from the inlet transition area 18 to a discharge area 24 at the rear of the combine 10. In the inlet transition area 18, the flow of crop materials changes from an axial or straight line flow through the feeder 12 to a helical flow about the longitudinal axis of the rotor 14. To accomplish this transition, helical flighting 25 is disposed about a reduced diameter inlet end 26 of the rotor 14, with the flighting 25 being tapered about the axis of the rotor 14 to define a conical-fustrum to permit closer placement of the inlet beater 17 to the rotor 14 without interference therebetween.

The crop materials are delivered by the flighting 25 to a threshing area 27 of the rotor 14 whereat a plurality of threshing elements 28 cause the crop materials to undergo shear and impact forces between the threshing elements 28 and axially disposed bars 29 (FIG. 2) of a concave 30. Guide vanes 32 which are helically disposed in relation to the axis of the rotor 14 about the interior top surface of the rotor casing 33 cause progressive rearward movement of the crop materials axially along the rotor 14 in a modified helical motion about the rotor 14.

Upon movement of the crop materials into a separation area 34, the crop materials continue to be subjected to a threshing action, but by different rasp bars or separating elements 35 axially disposed along the surface of the rotor 14 in conjunction with similar construction of the rotor casing 33, including the concave 30 and rotor guide vanes 32, to remove grain or the like from the crop materials.

Grain or the like from the threshing area 27 falls to an oscillating grain pan 37 and grain or the like from the separating area 34 falls to an oscillating separating pan 38, or directly onto the chaffer pans 39, with the pans 37, 38 in cascading relationship to a pair of cascading chaffer pans 36, 39 and a sieve pan 40. A blower 41 provides a source of air flow to aid in the chaffing and sieving operations such that clean grain is delivered to a grain auger 42 by an inclined grain pan 43 disposed below a portion of the sieve pan 40. Mixed grain and other crop component materials are delivered by another inclined pan 45 generally disposed below portions of the chaffer pan 39 and sieve pan 40 to a separation auger 46 for return to the inlet transition area 18 by means of an elevator 47 for rethreshing by the rotor 14. The grain auger 42 delivers the clean grain to a pair of saddle-type grain tanks 48 disposed on either side of the rotor 14 for temporary storage of the grain in the combine 10, or for discharge of the grain from the combine through a discharge duct 49.

An internal combustion engine 50 disposed near the rear of the combine above the rotor casing 33 provides the motive power for the various moving elements of the combine 10, including at least a pair of the wheels 51.

In accordance with one aspect of the present invention, the rotor 14 extends longitudinally to the rear of the combine 10 into a portion of the discharge area 24 and a portion 60 (FIGS. 3 and 4) of the rotor casing 33 likewise extends into the discharge area 24. The lower portion 60 of the rotor casing 33 is provided with a smooth nonperforated surface unlike the concave 30 in the threshing area 27 or in the separating area 34. Helical guide vanes 32 continue to be utilized on the upper inside surfaces of the rotor casing 33 in conjunction with the axially disposed separating elements 35 on the circumferential surface of the rotor 14 to positively engage and move the crop materials toward the discharge end 53 of the rotor 14. In this respect, it is important that the portion 60 of the rotor casing 33 in the discharge area 24 closely surround the rotor 14 as in the threshing area 27 and in the separating area 34, and preferably in the usual co-axial relationship between the rotor 14 and rotor casing 33.

The discharge end 53 of the rotor 14 is supported by an axial shaft 54 journaled in a bearing 55 which is in turn supported by a transverse beam 56. The beam 56 and bearing 55 are each threadedly secured for ease of removing the rotor 14 from the rear of the combine 10 for maintenance or other purposes. Such rearward removal of the rotor 14 eliminates the need to also remove the header 11 and feeder 12 from the combine 10 to remove the rotor 14 from the front of the combine. Centering pins 57 disposed in vertical and spaced apart frame members 58 align with appropriate apertures in the ends of the beam 56 for centering of the rotor 14 in the rotor casing 33.

Further in accordance with the present invention, portions 60 of the rotor casing 33 which surround the rotor 14 in the discharge area 24 are cutout, either in discrete steps or in a continuous edge in relation to the longitudinal axis of the rotor 14, such that increasingly greater circumferential portions of the rotor 14 are exposed along the axis of the rotor toward the discharge end 53. That is, the casing portion 60 which closely surrounds the rotor 14 near the discharge end 53 terminates short of the discharge end 53 at multiple points in relation to the axis of the rotor 14 in a manner which exposes progressively larger circumferential portions of the rotor 14 near the end 53. Such cutouts, as at 63 and 64, cause the threshed materials to tangentially leave the rotor 14 from multiple circumferential points as is diagrammatically illustrated in FIGS. 6 and 8. The multiplicity of circumferential points from which the material tangentially leaves the rotor 14 effectively spreads the discharge crop materials due to the multistream phenomena. The spreading is further enhanced by a deflecting plate 61 disposed below the discharge end 53 of the rotor 14, with the plate 61 sloping downwardly toward the rear of the combine 10. Most of the material discharged from the rotor 14 will strike the plate 61 before exhausting to the ground thereby slowing in velocity and being deflected rearwardly for further dispersion of the threshed materials. While the deflecting plate 61 is shown as a planar surface in the drawings, the plate 61 could also assume an appropriate curved surface. The deflecting plate 61 should be at a sufficient height to avoid significant restriction of air flow from the blower 41 about the various chaffer pans 36, 39, 40, 45.

It will be appreciated that a small fraction of the crop materials will generally exhaust from the first cutout 63 in the casing portion 60 due to any of a number of reasons such as matting of some of the crop materials during the threshing and separating steps, differing lengths of the crop materials, or partial or temporary adherence to the rotor 14. Thus, any crop materials which do not leave the rotor at the first or initial cutout 63 in the casing portion 60 will advance toward the discharge end 53 due to action of the vanes 32 on the upper surface of the rotor casing 33 to a larger cutout 64 during the next or successive rotations of the rotor 14. The vanes 32 in cooperation with the separating elements 35 on the rotor 14 cause the crop materials to follow a modified helical path about the rotor 14. Since the vanes 32 are only disposed on the upper portion of the rotor casing 33, the materials will tend to follow the helical path of the vanes 32 while in contact therewith. However, the materials will tend to follow a circular path about the rotor 14 when in contact with the concave 30. The change in pitch associated with one complete revolution through the modified helical path will also depend upon other conditions such as the type of material being threshed and the rotor speed.

As the various figures indicate, the cutouts 63, 64 are provided on the downturning side of the rotor 14. It is important to the success of the invention in discharging large volumes of threshed materials, without binding or plugging, that the materials discharge through the cutouts 63, 64 without any restriction which would reduced the natural and high tangential velocity imparted to the materials by the rotor 14. That is, the threshed materials should peel off the rotor 14 without appreciable reduction in tangential velocity which could be caused by restriction at the cutouts 63, 64. In this regard, it is preferable to have the sum of the widths, as measured along the longitudinal axis of the rotor 14, of the cutouts 63, 64 somewhat greater than the pitch of the modified helical path defined by the materials about the rotor 14. This insures that the materials about the rotor 14 will have at least one chance to discharge through one of the cutouts 63, 64 before reaching the discharge end 53 of the rotor 14. With some materials and crop conditions, it may be possible to limit the sum of the widths of the cutouts 63, 64 to slightly less than the pitch of the modified helical path and still obtain discharge without plugging, binding or other restriction.

To insure that none of the crop materials tangentially leave the rotor 14 as any undischarged materials begin to reach the upturning side of the rotor 14, a rounded cutoff edge 62 extends axially along the circumference of the rotor 14 to entrain the undischarged crop materials at the cutoffs 63, 64 against the rotor 14 for at least another partial revolution of the rotor until the undischarged crop materials again reach one of the cutoffs 63, 64 on the downturning side of the rotor 14. The rounded edge 62 guides the undischarged crop materials against the rotor 14 and avoids any material buildup therealong.

It is necessary to provide at least two stepped cutouts 63, 64 in the casing portion 60 to achieve an adequate dispersion of the discharged materials from the rotor 14.

Additional stepped cutouts will generally enhance the uniformity of the dispersion. Optimum positioning of the cutouts 63, 64 along the downturning side of the rotor 14 will ordinarily depend upon a number of factors; for example, the angular velocity of the rotor 14 and the type of materials being discharged. Stepped cutouts 63, 64 in the casing portion 60 constitute the presently preferred embodiment of the invention due to the ease and economy of manufacture as compared to a continuous arcuate edge 70 (FIG. 7), such as a helical edge, which provides a generally wedge-shaped cutout 71.

Regardless of the shape of cutout employed, an important aspect of the invention is that the cutouts progressively increase in angular width, as measured from the longitudinal axis of the rotor 14, as materials move toward the discharge end 53. The threshed materials will then discharge in streams of substantially equal angular width from the respective cutouts and will change from the modified helical path about the rotor 14 to a sheet of dispersed materials across the body width of the combine 10 after deflecting from the plate 61.

To further aid in dispersion of the crop materials, a baffle 65 (FIG. 4) may be vertically disposed between the deflecting plate 61 and the underside 66 of the cutoff edge 62. The baffle 65 is disposed at an acute angle relative to the axis of the rotor 14 to direct materials striking against the baffle out of the discharge area 24. A safety shield 67 (FIG. 4) may be disposed between the beam 56 and the discharge end 53 of the rotor 14 to substantially cover the discharge end 53 to avoid personal injury during rotation of the rotor 14 and to avoid winding of materials about the discharge end 53 or the shaft 54 of the rotor 14.

As illustrated in FIG. 9, a rotory chopping device 68 may be attached to the lower lip 69 of the deflecting plate 61 to chop the discharged crop materials before exhausting the same to the ground. Similarly, a rotary spreading device could be attached to or near the deflecting plate 61 for further spreading of the discharged materials. Without the uniform dispersion of the crop materials provided by the present invention, direct attachment of such chopping or spreading devices to the discharge end of a combine would either not be possible or would not provide satisfactory operation of the devices because the concentration of the discharged crop materials in a single stream would cause plugging or other unsatisfactory performance.

Implicit in the above description of the structural arrangement for discharging threshed materials in multiple streams are methods of discharging the materials from an axial flow combine. The basic method includes the steps of surrounding the rotor with the rotor casing near the discharge end for positively moving crop materials toward the discharge area of the combine and terminating the casing short of the discharge end of the rotor at angularly increasing widths toward the discharge end of the rotor such that the threshed materials tangentially discharge from the rotor at differing circumferential points for multi-stream discharge of the materials in angular widths substantially equal to the angular widths of the terminations. The cutouts may either be stepped in relation to the longitudinal axis of the rotor or continuous in relation thereto, such as a helix. An additional step of providing a deflecting plate below portions of the discharge end of the rotor exposed by cutouts in the casing such that the threshed materials deflect from the plate for further spreading before discharge to the ground, to further disperse the materials, may also be utilized. Another variation of the method may be to provide a curved cutoff edge in the casing of the rotor in the discharge area of the combine adjacent an upturning side of the rotor to entrain undischarged crop materials against the rotor for at least another partial revolution. A further step of using a rotary chopping or spreading device in an axial flow combine with a direct discharge system for chopping or spreading the discharged materials before exhausting the same to the ground may also be employed by attaching a rotary chopping or spreading device to or near the lower end of the deflecting plate 61.

It will be understood that various changes and modifications may be made without departing from the spirit of the invention as defined in the following claims.

We claim:

1. In an axial flow combine having a threshing and separating rotor co-axially disposed in a generally cylindrical casing provided on the interior with guide vanes for imparting a generally helical movement to the crop material, the improvement comprising:

having portions of said casing terminating short of the discharge end of the rotor in progressively increasing angular widths in the direction of the discharge end whereby the threshed materials discharge in streams having angular widths substantially equal to the angular widths of said terminating portions.

2. The axial flow combine as in claim 1 wherein the sum of the axial lengths of said terminating portions exceeds the pitch of said generally helical path adjacent the discharge end.

3. The axial flow combine as in claim 1 wherein said casing terminations define a plurality of steps in relation to the longitudinal axis of the rotor.

4. The axial flow combine as in claim 1 wherein the casing terminations define a generally helical edge in relation to the longitudinal axis of the rotor.

5. The axial flow combine as in claim 1 wherein said rotor and said casing are essentially horizontally disposed in said combine.

6. The axial flow combine as in claim 5 wherein deflecting means is disposed below portions of the rotor terminations in said casing such that the threshed materials which tangentially discharge from multiple circumferential points of the rotor are deflected rearwardly by the deflecting means before discharge to the ground.

7. The axial flow combine as in claim 6 further comprising chopping means disposed adjacent said deflecting means for chopping the directly discharged materials before dispersion to the ground.

8. The axial flow combine as in claim 6 further comprising rotary spreading means disposed adjacent said deflecting means for spreading the directly discharged materials before dispersion to the ground.

9. In an axial flow combine for threshing and separating crop materials including a rotor coaxially disposed in a generally cylindrical casing, the improvement comprising:

the rotor and rotor casing extending longitudinally in said combine substantially coextensively to adjacent the discharge end thereof, the rotor adapted to discharge threshed materials at the discharge end through the rotor casing in a multi-stream manner, a deflecting plate disposed below the discharge end of the rotor, and rotary chopping means disposed adjacent to the lower edge of said deflecting plate, and said deflecting plate being adapted to deflect at least a portion of said multi-stream discharge of crop materials into said rotary chopping means.

* * * * *